United States Patent
Baumgart et al.

(10) Patent No.: US 6,630,537 B1
(45) Date of Patent: Oct. 7, 2003

(54) COATING AGENT AND METHOD FOR PRODUCING SAME

(75) Inventors: Hubert Baumgart, Münster (DE); Heinz-Peter Rink, Münster (DE); Bernd Bruchmann, Freinsheim (DE); Fritz Bartol, Hamm (DE); Günther Mohrhardt, Speyer (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 09/463,054

(22) PCT Filed: Jul. 16, 1998

(86) PCT No.: PCT/EP98/04438

§ 371 (c)(1),
(2), (4) Date: Jan. 17, 2000

(87) PCT Pub. No.: WO99/05194

PCT Pub. Date: Feb. 4, 1999

(30) Foreign Application Priority Data

Jul. 22, 1997 (DE) .......................... 197 31 384

(51) Int. Cl.$^7$ .............................. C08J 3/00; C08K 3/20; C08L 75/00; C08F 283/04; C08G 18/00
(52) U.S. Cl. ................ 525/123; 524/589; 524/590; 524/591; 524/839; 524/840; 525/455; 528/44; 528/45; 528/73
(58) Field of Search ................ 524/589, 590, 524/591, 839, 840; 525/123, 455; 528/44, 45, 73

(56) References Cited

U.S. PATENT DOCUMENTS

| | | | |
|---|---|---|---|
| 3,290,350 A | 12/1966 | Hoover ........................ 260/453 |
| 3,492,330 A | 1/1970 | Trecker et al. | |
| 3,732,223 A | 5/1973 | Gizycki et al. .......... 260/249.8 |
| 3,830,785 A | 8/1974 | Shizuoka et al. .......... 260/77.5 |
| 3,919,228 A | 11/1975 | Von Gizycki et al. | |
| 4,005,961 A | 2/1977 | Manceau ..................... 425/190 |
| 4,099,638 A | 7/1978 | Tatsumi | |
| 4,130,577 A | 12/1978 | Nagato et al. .............. 260/453 |
| 4,230,713 A | 10/1980 | Bare .......................... 424/263 |
| 4,247,689 A | 1/1981 | Findeisen et al. ............. 544/97 |
| 4,375,539 A | 3/1983 | McBride et al. ............. 528/288 |
| 4,395,529 A | 7/1983 | Panandiker et al. | |
| 4,404,320 A | 9/1983 | Goto et al. | |
| 4,439,616 A | 3/1984 | Singh et al. ................... 560/25 |
| 4,489,135 A | 12/1984 | Drexler et al. ........... 428/423.1 |
| 4,522,762 A | 6/1985 | Oertel et al. | |
| 4,523,943 A | 6/1985 | Levitt ............................. 71/90 |
| 4,562,714 A | 1/1986 | Tanaka et al. | |
| 4,656,211 A | 4/1987 | Nasu et al. | |
| 4,754,014 A | 6/1988 | Ryntz et al. ................... 528/28 |
| 4,788,287 A | 11/1988 | Matsuo et al. ............... 544/196 |
| 4,861,672 A | 8/1989 | Miyabayashi et al. | |
| 4,880,891 A | 11/1989 | Miyabayashi et al. ........ 528/45 |
| 4,895,910 A | 1/1990 | Isozaki et al. ............. 525/326.5 |
| 4,914,148 A | 4/1990 | Hille et al. ................. 524/507 |
| 4,976,833 A | * 12/1990 | Debroy et al. .............. 525/528 |
| 5,036,039 A | 7/1991 | Sekine et al. ............... 503/217 |
| 5,043,312 A | 8/1991 | Hiraishi et al. ............. 503/208 |
| 5,043,315 A | 8/1991 | Sekine et al. ............... 503/217 |
| 5,051,473 A | 9/1991 | Tabuchi et al. ............. 525/100 |
| 5,079,312 A | 1/1992 | Isozaki et al. ............... 525/479 |
| 5,134,189 A | 7/1992 | Matsushita et al. ......... 524/549 |
| 5,159,045 A | 10/1992 | Haseyama et al. | |
| 5,198,462 A | 3/1993 | Natsugari et al. ........... 514/432 |
| 5,210,154 A | 5/1993 | Weidemeier et al. ....... 525/438 |
| 5,232,988 A | 8/1993 | Venham et al. | |
| 5,370,910 A | 12/1994 | Hille et al. ............... 427/408.1 |
| 5,475,073 A | 12/1995 | Guo ........................... 526/333 |
| 5,480,943 A | 1/1996 | Guo ........................... 525/330 |
| 5,523,164 A | 6/1996 | Shibato et al. .............. 428/461 |
| 5,534,598 A | 7/1996 | Guo ......................... 525/329.2 |
| 5,621,063 A | 4/1997 | Wolf et al. .................... 528/45 |
| 5,691,419 A | 11/1997 | Engelke et al. ............. 525/208 |
| 5,716,678 A | 2/1998 | Röckrath et al. ........ 427/407.1 |
| 5,719,246 A | 2/1998 | Taniguchi et al. ........... 526/320 |
| 5,780,541 A | * 7/1998 | Mayenfels et al. .......... 524/590 |
| 6,309,707 B1 | 10/2001 | Mayer et al. ................ 427/386 |

FOREIGN PATENT DOCUMENTS

| | | | |
|---|---|---|---|
| CA | 1089140 | 5/1926 | ............ C09D/3/72 |
| CA | 2139535 | 8/1995 | ......... C07D/251/34 |
| DE | 3000662 | 7/1981 | ........... C08G/18/80 |
| DE | 3001060 | 7/1981 | ........... C08G/18/80 |
| DE | 4432260 | 6/1995 | ......... C09D/133/04 |
| DE | 4432985 | 3/1996 | ......... C08F/277/00 |
| EP | 0 475 012 A1 | 7/1991 | ........... C08G/18/10 |
| EP | 0 540 985 A1 | 10/1992 | ........... C08G/18/40 |
| EP | 0 600 310 A1 | 11/1993 | ......... C07C/265/04 |
| EP | 0 752 433 A2 | 6/1996 | ........... C08G/18/32 |
| EP | WO 97/23536 | 7/1997 | ........... C08G/18/80 |
| WO | WO91/12899 | 9/1991 | ............ B05D/7/16 |

OTHER PUBLICATIONS

Chemical Abstract Accession No. 1998:498092, published, Aug. 4, 1998 Abstract for JP10204338.
Derwent Accession No. 1995–293654, published Aug. 1995, Abstract for DE 4405054.
English Abstract for DE4005961 on front page of the International Application No. WO91/12899.
English Abstract for DE4432260.
English Abstract for DE4432985.
Derwent Accession No. 1981–535380, English Abstract For DE3000662, 16–7–81.
Derwent Accession No. 1981–53770, English Abstract For DE3001060, 16–7–81.

\* cited by examiner

*Primary Examiner*—Patrick D. Niland

(57) ABSTRACT

A two-component coating composition comprising (I) a component comprising at least one isocyanate as crosslinking agent and (II) a component comprising at least one binder having functional groups which react with isocyanate groups. Component (I) comprises at least one isocyanate Ia) having at least one diisocyanate structural unit which has an unsaturated/aromatic or non-aromatic ring structure having 5–10 ring atoms and two isocyanate groups attached to the ring structure. Instead of this isocyanate Ia) or in addition thereto it is possible to use an oligomer Ib) of this isocyanate Ia) having from 2 to 10 isocyanate units, especially a trimer Ib) and/or partially blocked isocyanates Ia) and/or oligomers Ib)(=crosslinkers Ic).

21 Claims, No Drawings

COATING AGENT AND METHOD FOR PRODUCING SAME

The present invention relates to a two-component coating composition (2C system) which comprises (I) at least one isocyanate as crosslinking agent and (II) at least one binder having functional groups which react with isocyanates, and to its use.

PRIOR ART

By two-component coating compositions—dubbed 2C systems for short—is meant a system comprising two different, separately prepared and stored coating components which are nevertheless always employed in conjunction with one another and which, by a user wishing to produce a coating from a coating composition, are mixed to form the coating composition before the coating is produced. 2C systems of this kind are common, inter alia, for the production of top coats. The term top coats here refers to coating materials used to produce the topmost coating film. This topmost coating film can comprise one or more layers, especially two layers. Two-layer top coats (two-coat finishes) consist of a pigmented base coat film and, applied atop the base coat film, a clear coat film which is pigmented only with transparent pigments if at all. Two-coat finishes are nowadays produced by the wet-on-wet method, in which a pigmented base coat is applied first and the resulting base coat film is overpainted with a clear coat, without a baking step, and then base coat film and clear coat film are cured together. This method is highly advantageous economically but places high requirements on the base coat and the clear coat. The clear coat applied to the still uncured base coat must not start to dissolve, or otherwise interfere with, the base coat film, since otherwise the finishes obtained are of poor appearance. This applies in particular to coatings for which base coats comprising special-effect pigments (e.g. metal pigments, especially aluminium flakes, or pearlescent pigments) are employed.

2C systems, which are used primarily for the finishing of motor vehicles, consist normally of hydroxy-functional polyacrylates and/or polyesters and of free isocyanate trimers of hexamethylene diisocyanate or of isophorone diisocyanate (c.f. e.g. the patent texts DE-4432260, DE-4432985). These systems, however, have various grave disadvantages. In particular, coatings with good acid resistance possess only moderate scratch resistance. Conversely, when the scratch resistance is sufficient, the acid resistance is inadequate.

SUBJECT OF THE INVENTION

The present invention is therefore based on the object of providing a 2C system comprising in its component (I) at least one isocyanate as crosslinking agent and in its component (II) at least one binder having functional groups which react with isocyanates and which no longer has the abovementioned disadvantages but instead, in particular, combines good scratch resistance with good acid resistance.

This object is achieved in accordance with the invention in that component (I)

Ia) comprises at least one isocyanate having at least one diisocyanate structural unit which
  i) has an unsaturated/aromatic or non-aromatic ring structure having 5–10 ring atoms and
  ii) has two isocyanate groups attached to the ring structure, where
  iii) in the case of a non-aromatic ring structure
    α) both isocyanate groups are attached via linear $C_1$–$C_9$-alkyl and/or linear $C_2$–$C_{10}$-ether-alkyl or
    β) one isocyanate group is attached directly and the other via linear $C_2$–$C_9$-alkyl and/or linear $C_2$–$C_{10}$-ether-alkyl, and
  iv) in the case of an unsaturated aromatic ring structure at least one of the two isocyanate groups is attached via linear $C_2$–$C_9$-alkyl and/or linear $C_2$–$C_{10}$-ether-alkyl, both of which radicals have no benzylic hydrogen atoms, to the ring structure; and/or Ib) comprises at least one oligomer of the isocyanate Ia) having from 2 to 10 isocyanate units, especially a trimer; and/or Ic) comprises at least one partially blocked isocyanate Ia) and/or a partially blocked oligomer Ib), especially a trimer (Ib).

Component (I)

The essential constituent of component (i) according to the invention is at least one isocyanate Ia) to be used in accordance with the invention. This isocyanate has at least one diisocyanate structural unit having a specific structure. Although the isocyanate Ia) to be used in accordance with the invention can have two or more of these diisocyanate structural units, it has been found appropriate to use only one.

The diisocyanate structural unit has the following features according to the invention:

i) an unsaturated/aromatic or non-aromatic ring structure having 5–10 ring atoms and
ii) two isocyanate groups attached to the ring structure, where
iii) in the case of a non-aromatic ring structure
  α) both isocyanate groups are attached via linear $C_1$–$C_9$-alkyl and/or linear $C_2$–$C_{10}$-ether-alkyl or
  β) one isocyanate group is attached directly and the other isocyanate group via linear $C_2$–$C_9$-alkyl and/or linear $C_2$–$C_{10}$-ether-alkyl, and
iv) in the case of an unsaturated/aromatic ring structure at least one of the two isocyanate groups is attached via linear $C_2$–$C_9$-alkyl or linear $C_2$–$C_{10}$-ether-alkyl, both of which radicals have no benzylic hydrogen atoms, to the ring structure.

With regard to the diisocyanate structural unit of the diisocyanate Ia) to be used in accordance with the invention there are various possibilities for its further formation, which are described below.

In terms of the ring structure it is possible in principle for it to comprise heterocyclic rings. In that case the ring structure comprises not only C atoms as ring atoms but also other ring atoms, such as N atoms, C atoms or Si atoms, for example. These heterocyclic rings can be saturated or unsaturated/aromatic heterocyclic rings. Examples of suitable saturated heterocyclic rings are the silacyclopentane, silacyclohexane, oxolane, oxane, dioxane, morpholine, pyrrolidine, imidazolidine, pyrazolidine, piperidine or quinuclidine rings. Examples of suitable unsaturated/aromatic heterocyclic rings are pyrrole, imidazole, pyrazole, pyridine, pyrimidine, pyrazine, pyridazine or triazine rings. It is preferred if the ring structure contains exclusively C atoms as ring atoms.

The ring structure can on the one hand be free of bridges. In the case where the ring structure is a bicyclic terpene framework, decalin, adamantane or quinuclidine, however, bridges may be present. Examples of suitable terpene frameworks are carane, norcarane, pinane, camphane or norbornane frameworks.

The hydrogen atoms of a diisocyanate structural unit, especially of the ring structure, can be substituted by groups or atoms which react neither with isocyanates nor with the component (II) described below. Examples of suitable groups are nitro, alkyl, cycloalkyl, perfluoroalkyl, perfluorocycloalkyl or aryl groups. Examples of suitable atoms are halogen atoms, especially fluorine.

The ring structure consists advantageously of 6 C atoms, especially in the form of cyclohexane or benzene.

Examples of suitable linear $C_1$–$C_9$-alkyl are methylene or ethylene and also tri-, tetra-, penta-, hexa-, hepta-, octa- or nonamethylene radicals, especially methylene radicals.

The linear $C_2$–$C_{10}$-ether-alkyls are attached to the ring structure either via the oxygen atoms or via the alkanediyl radicals present therein. They are preferably attached thereto via the oxygen atoms. The indices 2 to 10 denote that there are from 2 to 10 C atoms in the ether-alkyls.

The ether-alkyls may contain only 1 oxygen atom. It is of advantage in accordance with the invention if from 2 to 10, especially 2 to 5, oxygen atoms is [sic] present in the chain. In that case 1 or more, but especially 2, C atoms are located between 2 oxygen atoms.

Examples of suitable $C_2$–$C_{10}$-ether-alkyls are

—(O—$CH_2$)$_m$—, wherein m=1 to 10,
—(O—$C_2H_4$)$_p$—, wherein p=1 to 5,
—(O—$C_3H_6$)$_q$—, wherein q=1 to 3, or
—(O—$C_4H_8$)$_r$—, wherein r=1 to 2.

If the isocyanate Ia) to be used in accordance with the invention comprises at least one diisocyanate structural unit having a non-aromatic ring system, especially cyclohexane, both isocyanate groups can be attached via —$CH_2$— preferably to positions 1 and 3 of the ring system. However, attachment at the 1,2 and 1,4 positions is also possible. In that case the diisocyanate structural unit, or the isocyanate Ia) to be used in accordance with the invention, has, for example, the formula $C_6H_8$(—$CH_2$—NCO)$_2$.

It is, however, also possible for one of the two isocyanate groups to be attached directly to a ring atom of a non-aromatic ring system, especially cyclohexane, and for the second isocyanate group to be attached via $C_2$–$C_9$-alkyl, especially $C_3$-alkyl, to a further ring atom, preferably in 1,2 configuration. The diisocyanate structural unit, or the isocyanate Ia) to be used in accordance with the invention, in that case has, for example, the formula $C_6H_8$(—NCO)(—$C_3H_6$NCO).

If the isocyanate Ia) to be used in accordance with the invention comprises at least one diisocyanate structural unit having an unsaturated/aromatic ring system, especially benzene, both isocyanate groups can be attached thereto via $C_2$–$C_9$-alkyl. It is essential to the invention that the alkanediyl radicals do not contain benzylic hydrogen atoms but instead carry substituents $R^1$ and $R^2$ which react neither with isocyanates nor with component (II). Examples of suitable substituents $R^1$ and $R^2$ are $C_1$–$C_{10}$-alkyl, aryl- or halogen, preferably —$CH_3$.

Examples of suitable alkanediyl groups, accordingly, are —$CR^1R^2$—($CH_2$)$_n$—, wherein n=1 to 8, especially 1 to 4, and $R^1$ and $R^2$=the substituents indicated above.

The above-described alkanediyl groups are preferably attached to positions 1 and 3 of the benzene ring. Nevertheless, attachment at positions 1,2 and 1,4 is possible in this case too. In that case the diisocyanate structural unit, or the isocyanate Ia) to be used in accordance with the invention, has, for example, the formula $C_6H_4$(—$C(CH_3)_2$—$C_2H_4$—NCO)$_2$.

Nevertheless, the two isocyanate groups can also be attached to the unsaturated/aromatic ring system, especially benzene, via the above-described $C_2$–$C_{10}$-ether-alkyls. It is essential to the invention that the ether-alkyls do not carry any benzylic hydrogen atoms. In the case where the ether-alkyls are linked via C atoms to the aromatic ring system, this can be achieved by the benzylic C atoms carrying the above-described substituents $R^1$ and $R^2$. If the ether-alkyls are linked via oxygen atoms to the aromatic ring system, there are no benzylic hydrogen atoms, and for this reason this variant is preferred.

Here too, it is possible for one of the two isocyanate groups to be attached directly to a ring atom of an unsaturated/aromatic ring system, preferably a benzene ring, and for the second isocyanate group to be attached to a further ring atom, preferably in 1,2 configuration, for example via $C_3$–$C_9$-alkyl which has no benzylic hydrogen atoms. In that case the diisocyanate structural unit, or the isocyanate Ia) to be used in accordance with the invention, has, for example, the formula $C_6H_4$(—NCO)(—$C(CH_3)_2$—($CH_2$)$_2$—NCO).

At least one of the isocyanates Ia) to be used in accordance with the invention and described above in detail can be used as such as crosslinking agent in component (I) according to the invention.

Instead of the isocyanate Ia) or in addition thereto it is possible to use at least one oligomer Ib) as crosslinking agent in component (I) of the invention. The oligomer Ib) is prepared from the isocyanate Ia), in which case 2–10 monomer units are advantageously reacted, and trimerization is particularly preferred. Oligomerization and trimerization can lead, with the aid of customary and known, appropriate catalysts, to the formation of uretdione, biuret, isocyanurate, urea and/or allophanate groups. Alternatively, oligomerization is possible by reaction with low molecular mass polyols, such as trimethylolpropane or homotrimethylolpropane, glycerol, neopentyl glycol, dimethylolcyclohexane, ethylene glycol, diethylene glycol, propylene glycol, 2-methyl-2-propyl-1,3-propanediol, 2-ethyl-2-butyl-1, -propanediol [sic], 3,2,2,4-trimethyl-1,5-pentanediol [sic] and 2,2,5-trimethyl-1,6-hexanediol, which, if necessary, may have been partially ethoxylated and/or propoxylated or otherwise rendered hydrophilic.

Instead of the isocyanate Ia) and/or of the oligomer Ib) or in addition to these two it is possible to use at least one partially blocked isocyanate Ia) and/or at least one partially blocked oligomer Ib) as crosslinking agents Ic) in component (I) according to the invention. Examples of suitable blocking agents are the blocking agents known from U.S. Pat. No. 4,444,954, such as i) phenols, such as phenol, cresol, xylenol, nitrophenol, chlorophenol, ethylphenol, t-butylphenol, hydroxybenzoic acid, esters of this acid or 2,5-di-t-butyl-4-hydroxytoluene, ii) lactams, such as ε-caprolactam, δ-valerolactam, γ-butyrolactam or β-propiolactam, iii) active methylenic compounds, such as diethyl malonate, dimethyl malonate, ethyl acetoacetate, methyl acetoacetate or acetylacetone; iv) alcohols, such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin 1,3-dichloro-2-propanol or acetocyanohydrin; v) mercaptans, such as butyl mercaptan, hexyl mercaptan, t-butyl mercaptan, t-dodecyl mercaptan, 2-mercaptobenzothiazole, thiophenol, methylthiophenol or ethylthiophenol; vi) acid amides, such as acetanilide, acetoanisidinamide, acrylamide, methacrylamide, acetamide, stearamide or benzamide, vii) imides, such as succinimide, phthalimide or maleimide; viii) amines, such as diphenylamine, phenylnaphthylamine, xylidine, N-phenylxylidine, carbazole, aniline, naphthylamine, butylamine, dibutylamine or butylphenylamine; ix) imidazoles, such as imidazole or 2-ethylimidazole; x) ureas, such as urea, thiourea, ethyleneurea, ethylenethiourea or 1,3-diphenylurea; xi) carbamates, such as phenyl N-phenylcarbamate or 2-oxazolidone; xii) imines, such as ethylenimine; xiii) oximes, such as acetone oxime, formaldoxime, acetaldoxime, acetoxime, methyl ethyl ketoxime, diisobutyl ketoxime, diacetyl monoxime, benzophenone oxime or chlorohexanone oximes; xiv) salts of sulphurous acid, such as sodium bisulphite or potassium bisulphite; xv) hydroxamic esters, such as benzyl methacrylohydroxamate (BMH) or allyl methacrylohydroxamate, or xvi) substituted pyrazoles, ketoximes, imidazoles or triazoles.

The above-described oligomers Ib) or Ic) and trimers Ib) or Ic) to be used in accordance with the invention advantageously have an NCO functionality of 2.0–5.0, preferably of 2.2–4.0 and, in particular, of 2.5–3.8.

The above-detailed isocyanates Ia) to be used in accordance with the invention, their oligomers Ib) and/or trimers Ib) to be used in accordance with the invention and/or the crosslinkers Ic) to be used in accordance with the invention can be the only crosslinking agents present in component (I) according to the invention.

Nevertheless, there may also be further crosslinking agents in component (I) according to the invention, preferably in a proportion by weight of 10–90%, especially 40–60%, based on the overall amount of crosslinking agents in component (I).

Suitable additional crosslinking agents are in particular the above-described isocyanates Ia) and/or their oligomers Ib) and/or trimers Ib) whose free isocyanate groups have been blocked completely with the above-described customary and known blocking agents.

Also suitable as additional crosslinking agents are the customary and known isocyanates and/or their trimers and/or oligomers. These comprise any desired organic polyisocyanates having isocyanate groups attached to aliphatic, cycloaliphatic, araliphatic and/or aromatic structures. Preference is given to employing polyisocyanates having 2 to 5 isocyanate groups per molecule and having viscosities of from 100 to 2000 mPa.s (at 23° C.). If desired, small amounts of organic solvent, preferably from 1 to 25% by weight based on pure polyisocyanate, can be added to the polyisocyanates in order so to improve the ease of incorporation of the isocyanate and, if desired, to reduce the viscosity of the polyisocyanate to a value within the abovementioned ranges. Examples of solvents suitable as additives for the polyisocyanates are ethoxyethyl propionate, butyl acetate and the like.

Examples of suitable isocyanates are described, for example, in "Methoden der organischen Chemie", Houben-Weyl, Volume 14/2, 4th edition, Georg Thieme Verlag, Stuttgart 1963, page 61 to 70, W. Siefken, Liebigs Ann. Chem. 562, 75 to 136, the European Patent EP-A-101 832 or the U.S. Pat. Nos. 3,290,350, 4,130,577 and 4,439,616. Some of them are also available commercially, such as 1,3-bis(2-isocyanatoprop-2-yl)benzene from the American Cyanamid Company under the trade name TMXDI (META) ®.

Examples of suitable known polyisocyanates are phenylene diisocyanate, tolylene diisocyanate, xylylidene diisocyanate, 1,3-bis(2-isocyanatoprop-2-yl)benzene (tetramethylxylylidene diisocyanate), bisphenylene diisocyanate, naphthylene diisocyanate, diphenylmethane diisocyanate, isophorone diisocyanate, cyclopentyl diisocyanate, cyclohexyl diisocyanate, methylcyclohexylene diisocyanate, 2-isocyanatopropylcyclohexyl isocyanate, dicyclohexylmethane 2,4'-diisocyanate or dicyclohexylmethane 4,4'-diisocyanate, trimethylene diisocyanate, tetramethylene diisocyanate, pentamethylene diisocyanate, hexamethylene diisocyanate, propylene diisocyanate, ethylethylene diisocyanate and trimethylhexane diisocyanate.

Also suitable are the customary and known isocyanate-functional polyurethane prepolymers, which can be prepared by reacting the abovementioned polyols with an excess of these polyisocyanates, and which are preferably of low viscosity. It is also possible to employ the customary and known polyisocyanates containing isocyanurate groups, biuret groups, allophanate groups, urethane groups, urea groups and/or uretdione groups. Polyisocyanates containing urethane groups, for example, are obtained by reacting some of the isocyanate groups with the abovementioned polyols. It is preferred to employ aliphatic or cycloaliphatic polyisocyanates, especially tetramethylene diisocyanate, hexamethylene diisocyanate, dimerized and trimerized tetramethylene diisocyanate or hexamethylene diisocyanate, isophorone diisocyanate, 2-isocyanatopropylcyclohexyl isocyanate, dicyclohexylmethane 2,4'-diisocyanate or dicyclohexyl-methane 4,4'-diisocyanate or mixtures of these polyisocyanates. Very particular preference is given to the use of mixtures of polyisocyanates which contain uretdione, isocyanurate and/or allophanate groups and are based on hexamethylene diisocyanate, as are formed by catalytic oligomerization of hexamethylene diisocyanate using appropriate catalysts.

As further crosslinking agents it is possible, furthermore, to use the above-described customary and known polyisocyanates and their oligomers or trimers, all or some of whose isocyanate groups have been blocked. Suitable blocking agents are the above-described customary and known blocking agents.

As further crosslinking agents, moreover, it is possible to use the customary and known tris(alkoxy-carbonylamino) triazines, as are described in the U.S. Pat. No. 5,084,541.

Further crosslinks [sic] which can be added to component (I), furthermore, are the customary and known melamine resins, amino resins, carbodiimides, aziridines, epoxides and/or siloxanes.

Component (II)

The other essential constituent of the 2C system of the invention is component (II). Its essential constituent, in turn, are binders based on polymers which contain functional groups that react with isocyanate groups.

Examples of polymers highly suitable in accordance with the invention are polyacrylates, polyesters, polyurethanes, acrylicized polyurethanes or acrylicized polyesters. One example of a functional group which is particularly highly suitable in accordance with the invention is the hydroxyl group. Examples of binders which are particularly highly suitable in accordance with the invention are the abovementioned polymers having an OH number in the range 20–400, especially in the range 80–250 and, specifically, in the range 80–200.

Polyurethanes

The polyurethanes employed as binders are known in principle. Suitable examples are the polyurethane resins described in the literature for use in waterborne coating materials. Examples of highly suitable polyurethane resins are known from the European and German Patents EP-A-355433, DE-A-3545618, DE-A-3813866 or are described in the as yet unpublished German Patent Application DE 4005961.8. For further details of the preparation of the polyurethane resins and examples of suitable compounds reference may therefore be made to these documents. Advantageously, these polyurethane resins are employed in solution in one or more organic solvents.

It is preferred to employ water-dilutable polyurethane resins which have a number-average molecular weight (determined by gel permeation chromatography with polystyrene as standard) of from 1000 to 30,000, preferably from 1500 to 20,000, and an acid number of from 5 to 70 mg of KOH/g, preferably from 10 to 30 mg of KOH/g, and which can be prepared by reaction—preferably chain extension—of isocyanate-functional prepolymers.

The isocyanate-functional prepolymer can be prepared by reacting polyols having a hydroxyl number of from 10 to 1800, preferably from 50 to 1200 mg of KOH/g with excess polyisocyanates at temperatures of up to 150° C., preferably from 50 to 130° C., in organic solvents which are unable to react with isocyanates. The ratio of equivalents of NCO to OH groups lies between 2.0:1.0 and 1.0:1.0, preferably between 1.4:1 and 1.1:1.

The polyols employed to prepare the prepolymer can be of low and/or high molecular mass and may include anionic groups which are slow to react. In order to increase the hardness of the polyurethane it is possible to employ low molecular mass polyols. They have a molecular weight of from 60 to about 400 and can contain aliphatic, alicyclic or aromatic groups. In this case amounts of up to 30% by weight of the overall polyol constituents, preferably from about 2 to 20% by weight, are employed.

In order to obtain a highly flexible NCO pre-polymer it is preferred to add a high proportion of a predominantly linear polyol having a preferred OH number of from 30 to 150 mg of KOH/g. Up to 97% by weight of the overall polyol can consist of saturated and unsaturated polyesters and/or polyethers having a molecular mass $M_n$ of from 400 to 5000. The polyetherdiols selected should not introduce excess amounts of ether groups, since otherwise the polymers formed start to swell in water. Polyesterdiols are prepared by esterifying organic dicarboxylic acids or their anhydrides with organic diols, or are derived from a hydroxycarboxylic acid or from a lactone. In order to prepare branched polyesterpolyols it is possible to a minor extent to employ polyols or polycarboxylic acids having a higher functionality.

Typical multifunctional isocyanates used are aliphatic, cycloaliphatic and/or aromatic polyisocyanates having at least two isocyanate groups per molecule. Preference is given to the isomers or isomer mixtures of organic diisocyanates. On the basis of their good stability to ultraviolet light, (cyclo)aliphatic diisocyanates give rise to products having a low propensity towards yellowing.

The polyisocyanate component used to form the prepolymer may also include a proportion of polyisocyanates of higher functionality, provided that this does not cause gelling. Products which have proven appropriate as triisocyanates are those formed by trimerization or oligomerization of diisocyanates or by reaction of diisocyanates with polyfunctional compounds containing OH or NH groups. The average functionality can be lowered if desired by adding monoisocyanates.

Examples of suitable polyisocyanates are the polyisocyanates described as additional crosslinking agents in component (I) according to the invention, and/or their oligomers or trimers, in unblocked or partially blocked form.

To prepare water-compatible polyurethanes it is possible to use compounds which contain two isocyanate-reactive H-active groups and at least one group which ensures the dispersibility in water (carrier groups). Suitable carrier groups are nonionic groups (e.g. polyethers), anionic groups, mixtures of these two groups or cationic groups.

It is thus possible to build into the polyurethane resin such a high acid number that the neutralized product can be dispersed stably in water. Compounds used for this purpose are those containing two isocyanate-reactive H-active groups and at least one group which is capable of forming anions. Suitable isocyanate-reactive groups are, in particular, hydroxyl groups and also primary and/or secondary amino groups. Groups capable of forming anions are carboxyl groups, sulphonic acid groups and/or phosphonic acid groups. It is preferred to use carboxylic acid groups or carboxylate groups. They should be sufficiently slow to react that the isocyanate groups of the diisocyanate react preferentially with the other isocyanate-reactive groups of the molecule. For this purpose use is made of alkanoic acids having two substituents on the α carbon atom. The substituent can be a hydroxyl group, an alkyl group or an alkylol group. These polyols have at least one, generally 1 to 3 carboxyl groups in the molecule. They have from two to about 25, preferably 3 to 10, carbon atoms. The carboxyl-containing polyol can account for from 3 to 100% by weight, preferably from 5 to 50% by weight, of the overall polyol constituent in the NCO prepolymer.

The amount of ionizable carboxyl groups available as a result of neutralization of the carboxyl groups in salt form is generally at least 0.4% by weight, preferably at least 0.7% by weight, based on solids. The upper limit is about 6% by weight. The amount of dihydroxyalkanoic acids in the unneutralized prepolymer gives rise to an acid number of at least 5, preferably at least 10. At very low acid numbers there is generally a need for further measures to achieve dispersibility in water. The upper limit on the acid number is 70, preferably 40 mg of KOH/g, based on solids.

Advantageous NCO prepolymers can be prepared by simultaneous reaction of the polyol or polyol mixture with excess diisocyanate. Alternatively, the reaction can also be carried out in stages in the prescribed sequence. Examples are described in the German Patents DE-A-26 24 442 and DE-A-32 10 051. The reaction temperature is up to 150° C., preference being given to a temperature in the range from 50 to 130° C.

Reaction is continued until virtually all the hydroxyl functions have been converted.

Advantageous NCO prepolymers contain at least about 0.5% by weight of isocyanate groups, preferably at least 1% by weight NCO, based on solids. The upper limit is about 15% by weight, preferably 10% by weight and, with particular preference, 5% by weight.

The reaction can be carried out if desired in the presence of a catalyst, such as organotin compounds and/or tertiary amines. In order to keep the reactants in the liquid state and to permit better temperature control during the reaction, it is possible to add organic solvents containing no Zerewitinov active hydrogen. The amount of solvent can vary within wide limits and should be sufficient to form a prepolymer solution of appropriate viscosity. In general from 10 to 70% by weight of solvent is employed, preferably from 20 to 50% by weight of solvent, based on the solids content.

The remaining isocyanate groups of the prepolymer are reacted with a modifier. This reaction leads in particular to further linking and to an increase in the molecular weight. The amount of this modifier is determined by its functionality and by the NCO content of the prepolymer. The ratio of equivalents of the active hydrogen atoms in the modifier to the NCO groups in the prepolymer should generally be less than 3:1 and should preferably lie within the range between 1:1 and 2:1.

As modifiers for the reaction with the prepolymer it is preferred to employ diols, with particular preference triols and/or polyols.

However, it is also possible to employ other compounds having active hydrogen atoms as modifiers, examples being polyamines, albeit only subject to the proviso that the reaction of the prepolymer with the modifier can be carried out in an organic solvent (can be controlled) and that in the course of this reaction there are no unwanted reactions, such as, for example, the gelling at the point of dropwise addition of the amine, which is frequently observed when polyamines are employed.

Examples of polyols containing at least three hydroxyl groups are trimethylolpropane, glycerol, erythritol, mesoerythritol, arabitol, adonitol, etc. Trimethylolpropane is preferably employed. The reaction of the prepolymer with the tri- and/or polyols is preferably controlled by the stoichiometry of the compounds employed such that chain extensions occur.

Polyacrylates

The polyacrylate resins employed as binders are likewise known and are described, for example, in DE-A-3832826. Water-dilutable or water-dispersible polyacrylate resins are generally suitable. Advantageously, they can be prepared in the form of organic solutions.

For clear coats in particular, it is preferred to employ polyacrylate resins which have hydroxyl numbers of from 40 to 240, preferably from 60 to 210 and, with very particular preference, from 100 to 200, acid numbers of from 0 to 35, preferably from 0 to 23 and, with very particular preference from 3.9 to 15.5, glass transition temperatures of from −35 to +70° C., preferably from −20 to +40° C. and, with very particular preference, from −10 to +15° C., and number-average molecular weights $M_n$ of from 1500 to 30,000, preferably from 2000 to 15,000 and, with very particular preference, from 2500 to 5000, the ratio $M_w/M_n$ lying between 1.2 and 5.0, preferably 1.2 and 4.0.

The glass transition temperature of the polyacrylate resins is determined by the nature and amount of the monomers employed and can be estimated in a customary and known manner on the basis of the number n different monomers incorporated by polymerization in the polyacrylate resin, the proportion by weight of the nth monomer and the glass transition temperature of the homopolymer of the nth monomer. The person skilled in the art is therefore able to select the monomers in a simple manner.

Similarly, measures for controlling the molecular weight (e.g. selection of appropriate polymerization initiators, use of chain transfer agents, etc.) are part of the expert knowledge of the person of average skill in the art and need not be elucidated further here.

Examples of the hydroxy-functional binder component employed are polyacrylate resins which can be prepared by subjecting (a1) from 10 to 92, preferably from 20 to 60% by weight of an alkyl or cycloalkyl acrylate or of an alkyl or cycloalkyl methacrylate having 1 to 18, preferably 4 to 13 carbon atoms in the alkyl or cycloalkyl radical, or mixtures of such monomers, (b1) from 8 to 60, preferably 12.5 to 38.5% by weight of a hydroxyalkyl(meth)acrylate and/or of a hydroxycycloalkyl(meth)acrylate having 2 to 4 carbon atoms in the hydroxyalkyl radical, or mixtures of such monomers, (c1) from 0.0 to 5.0, preferably from 0.7 to 3.0% by weight of acrylic acid or methacrylic acid, or mixtures of these monomers, and (d1) from 0 to 50, preferably from 0 to 30% by weight of ethylenically unsaturated monomers which can be copolymerized with (a1), (b1) and (c1) and are different from (a1), (b1) and (c1), or mixtures of such monomers, to polymerization to give polyacrylate resins having hydroxyl numbers of from 40 to 240, preferably from 60 to 150, acid numbers of from 0 to 35, preferably from 5 to 20, glass transition temperatures of from −35 to +70 degrees C., preferably from −20 to 140 degrees C., and number-average molecular weights of from 1500 to 30,000, preferably from 2000 to 15,000 (determined by gel permeation chromatography with polystyrene standard). Examples of components (a1) are: methyl, ethyl, propyl, n-butyl, isobutyl, tert-butyl, pentyl, hexyl, heptyl and 2-ethylhexyl acrylate or methacrylate, cyclohexyl acrylate and cyclohexyl methacrylate, tert-butylcyclohexyl(meth)acrylate or isobornyl(meth)acrylate. Examples of components (b1) are: hydroxyethyl, hydroxypropyl, hydroxybutyl or cyclohexanedimethanol acrylate or methacrylate, and also adducts of Versatic acid glycidyl ester and (meth)acrylic acid. Examples of components (d1) are: vinylaromatic compounds, such as styrene, vinyltoluene, α-methylstyrene, α-ethylstyrene, ring-substituted diethylstyrenes, isopropylstyrene, butylstyrenes and methoxystyrenes; vinyl ethers, such as ethyl vinyl ether, n-propyl vinyl ether, isopropyl vinyl ether, n-butyl vinyl ether and isobutyl vinyl ether, and vinyl esters, such as vinyl acetate, vinyl propionate, vinyl butyrate, vinyl pivalate and the vinyl ester of 2-methyl-2-ethylheptanoic acid, for example. The hydroxyl number and the acid number of the polyacrylate resins can easily be controlled by the person skilled in the art via the amount of component (b1) and/or (c1) employed.

Also employed as hydroxy-functional binder component are, for example, polyacrylate resins obtainable by subjecting (A1) from 10 to 51% by weight, preferably from 25 to 41% by weight, of 4-hydroxy-n-butyl acrylate or 4-hydroxy-n-butyl methacrylate, or a mixture of 4-hydroxy-n-butyl acrylate and 4-hydroxy-n-butyl methacrylate, preferably 4-hydroxy-n-butyl acrylate, (A2) from 0 to 36% by weight, preferably from 0.1 to 20% by weight, of a hydroxyl-containing ester of acrylic acid or of a hydroxyl-containing ester of methacrylic acid, which ester is different from (A1), or of a mixture of such monomers, (A3) from 28 to 85% by weight, preferably from 40 to 70% by weight, of an aliphatic or cycloaliphatic ester of methacrylic acid having at least 4 C atoms in the alcohol residue, which ester is different from (A1) and (A2), or of a mixture of such monomers, (A4) from 0 to 3% by weight, preferably from 0.1 to 2% by weight, of an ethylenically unsaturated carboxylic acid or of a mixture of ethylenically unsaturated carboxylic acids, and (A5) from 0 to 20% by weight, preferably from 5 to 15% by weight, of an unsaturated monomer which is different from (A1), (A2), (A3) and (A4), or of a mixture of such monomers, to polymerization to give a polyacrylate resin having a hydroxyl number of from 60 to 200, preferably from 100 to 160, an acid number of from 0 to 35, preferably from 0 to 25, and a number-average molecular weight of from 1500 to 10,000, preferably from 2500 to 5000, the sum of the parts by weight of components (A1) to (A5) always being 100% and the composition of component (A3) being chosen such that polymerization of component (A3) alone gives a polymethacrylate resin having a a [sic] glass transition temperature of from +10 to +100 degrees C., preferably from +20 to +60 degrees C. Examples of component (A2) are: hydroxyalkyl esters of acrylic acid, such as hydroxyethyl acrylate and hydroxypropyl acrylate, and hydroxyalkyl esters of methacrylic acid, such as hydroxyethyl methacrylate and hydroxypropyl methacrylate, for example, in which case the choice is to be made such that polymerization of component (A2) alone gives a polyacrylate resin having a glass transition temperature of from 0 to +80 degrees C., preferably from +20 to +60 degrees C. Examples of component (A3) are: aliphatic esters of methacrylic acid having 4 to 20 C atoms in the alcohol residue, such as n-butyl, iso-butyl, tert-butyl, 2-ethylhexyl, stearyl and lauryl methacrylate, and cycloaliphatic esters of methacrylic acid, such as cyclohexyl methacrylate. As component (A4) it is preferred to employ acrylic acid and/or methacrylic acid. Examples of component (A5) are: vinyl aromatic hydrocarbons, examples being styrene, α-alkylstyrene and vinyltoluene, amides of acrylic acid and methacrylic acid, examples being methacrylamide and acrylamide, nitriles of acrylic acid and methacrylic acid, vinyl ethers and vinyl esters. As component (A5) it is preferred to employ vinyl aromatic hydrocarbons, especially styrene. The composition of component (A5) should preferably be such that polymerization of component (A5) alone gives a polymer having a glass transition temperature of from +70 to +120 degrees C., preferably from +80 to +100 degrees C. The acid number can be adjusted by the skilled worker by using appropriate amounts of component (A4). The same applies to the adjustment of the hydroxyl number. It can be controlled by way of the amount of component (A1) and (A2) employed.

In a variant of the polyacrylate resin described in the preceding paragraph, the following numerical parameters are valid. Component (A1) is employed at 21–62, preferably 41–57% by weight. Component (A3) is employed at 28–75, preferably 34–54% by weight. The composition of component (A3) is chosen such that polymerization of component (A3) alone gives a polymethacrylate resin having a glass transition temperature of from +10 to +100 degrees C., preferably from +20 to +60 degrees C. Examples of component (A2) are: hydroxyalkyl esters of acrylic acid, such as hydroxyethyl acrylate and hydroxypropyl acrylate, for example, and hydroxyalkyl esters of methacrylic acid, such as hydroxyethyl methacrylate and hydroxypropyl methacrylate, for example, where the choice should be made such that polymerization of component (A2) alone gives a polyacrylate resin having a glass transition temperature of from 0 to +80 degrees C., preferably from +20 to +60 degrees C. Examples of component (A3) are: aliphatic esters of methacrylic acid having 4 to 20 C atoms in the alcohol residue, such as n-butyl, isobutyl, tert-butyl, 2-ethylhexyl, stearyl and lauryl methacrylate, for example, and cycloaliphatic esters of methacrylic acid, such as cyclohexyl methacrylate, for example. As component (A4) it is preferred to employ acrylic acid and/or methacrylic acid. Examples of component (A5) are: vinyl aromatic hydrocarbons, such as styrene, α-alkylstyrene and vinyltoluene, amides of acrylic acid and methacrylic acid, such as methacrylamide and acrylamide, nitriles of acrylic acid and methacrylic acid, vinyl ethers and vinyl esters. As component (A5) it is preferred to employ vinyl aromatic hydrocarbons, especially styrene. The composition of component (A5) should preferably be made such that polymerization of component (A5) alone gives a polymer having a glass transition temperature of from +70 to +120 degrees C., preferably from +80 to +100 degrees C. The acid number can be adjusted by the skilled worker using appropriate amounts of component (A4). The same applies to the adjustment of the hydroxyl number. It can be controlled by way of the amount of component (A1) and (A2) employed.

In a variant of the polyacrylate resin described in the preceding paragraph, the following numerical parameters are valid. Component (A1) is employed at 21–62, preferably 41–57% by weight. Component (A3) is employed at 28–75, preferably 34–54% by weight. Component (A3) is chosen in terms of its composition such that polymerization of component (A3) alone gives a polymer having a glass transition temperature of from 0 to +80° C., preferably from 0 to 160° C. Component (A5) is chosen in terms of its composition such that polymerization of component (A5) alone gives a polymer having a glass transition temperature of from +70 to +120° C. The hydroxyl number of the resulting polyacrylate resin lies within the range 100–240, preferably within the range 160–220, most preferably within the range 170–200. It is preferred if the acrylate resin contains numerous primary hydroxyl groups (e.g. 50–100% of the OH groups overall). It is also preferred if the acrylate resin has a glass transition temperature of not more than 70° C., preferably from −40 to +30° C. Finally, it is preferred if the polyacrylate resin is selected such that the cured coating composition has a storage modulus E in the rubber-elastic range of more than $10^{7.5}$ Pa, preferably more than $10^{7.7}$ Pa , and a loss factor tan d [sic] at 20° C. of at least 0.05, preferably more than 0.07, the storage modulus E and the loss factor tan d [sic] having been measured by dynamo-mechanical thermoanalysis (see Murayama, T., Dynamic Mechanical Analysis of Polymeric Material, Elsevier, N.Y., 1978, and Loren W. Hill, Journal of Coatings Technology, Vol. 64, No. 808, May 1992, p. 31–33) on homogeneous free films having a film thickness of 40±10 μm. Where parameters are not specified, they are in any case in agreement.

Examples of further highly suitable polyacrylates are known from the European Patents EP-A-666780 or EP-A-767185 or the U.S. Pat. Nos. 5,480,943, 5,475,073 and 5,534,598.

The preparation of these polyacrylate resins can take place in accordance with generally well-known polymerization techniques (see e.g. Houben-Weyl, Methoden der organischen Chemie, 4th edition, Vol. 14/1, page 24 to 255 (1961)). They are preferably prepared by means of solvent polymerization. Normally in this case an organic solvent or solvent mixture is introduced as initial charge and heated to boiling. The monomer mixture to be polymerized, and also one or more polymerization initiators, are then added continuously to this organic solvent or solvent mixture. Polymerization takes place at temperatures between 100 and 180° C., preferably between 130 and 150° C. As polymerization initiators it is preferred to employ free-radical initiators. The type and amount of initiator are usually chosen such that the supply of free radicals at the polymerization temperature during the feed phase is as constant as possible. Examples of initiators which can be employed are: dialkyl peroxides, such as di-tert-butyl peroxide and dicumyl peroxide; hydroperoxides, such as cumene hydroperoxide and tert-butyl hydroperoxide; per esters, such as tert-butyl perbenzoate, tert-butyl perpivalate, tert-butyl per-3,5,5-trimethylhexanoate and tert-butyl per-2-ethylhexanoate, or azo compounds, such as azobisisobutyronitrile. The polymerization conditions (reaction temperature, feed time of the monomer mixture, type and amount of organic solvents and polymerization initiators, possible use of molecular weight regulators, e.g. mercaptans, thioglycolic esters and chlorinated hydrocarbons) are selected such that the polyacrylate resins have a number-average molecular weight as stated (determined by gel permeation chromatography using polystyrene as calibrating substance).

Polyesters

As binders it is also possible to use water-dilutable or water-dispersible polyester resins which can be prepared in the form of organic solutions. Use is made, for example, of corresponding commercial water-dilutable or water-dispersible polyester resins, and of the polyester resins that are customarily employed in waterborne coating materials.

For clear coats in particular, the hydroxy-functional binder component employed comprises, for example, polyester resins or alkyd resins which are preparable by reacting (a) a cycloaliphatic or aliphatic polycarboxylic acid or a mixture of such polycarboxylic acids and/or their anhydrides, (b) an aliphatic or cycloaliphatic polyol having more than two hydroxyl groups in the molecule, or a mixture of such polyols, (c) an aliphatic or cycloaliphatic diol or a mixture of such diols, and (d) an aliphatic linear or branched saturated monocarboxylic acid, or a mixture of such monocarboxylic acids, in a molar ratio of (a2):(b2):(c2):(d2)= 1.0:0.2–1.3:0.0–1.1:0.0–1.4, preferably 1.0:0.5–1.2:0.0–0.6:0.2–0.9 to give a polyester resin and alkyd resin, respectively. Examples of the constituent (a) are: hexahydrophthalic acid, hexahydrophthalic anhydride, 1,4-cyclohexane-dicarboxylic acid, endomethylenetetrahydrophthalic acid, camphoric anhydride, oxalic acid, malonic acid, succinic acid, glutaric acid, adipic acid, pimelic acid, suberic acid, azelaic acid and sebacic acid. Examples of the constituent (b2) are: pentaerythritol, trimethylolpropane, trimethylolethane and glycerol. Examples of the constituent (c2) are: ethylene glycol, diethylene glycol, propylene glycol, neopentyl glycol, 2-methyl-2-propyl-1,3-propanediol, 2-ethyl-2-butyl-1,3-propanediol, 2,2,4-trimethyl-1,5-pentanediol, 2,2,5-trimethyl-1,6-hexanediol, neopentyl glycol hydroxypivalate and dimethylolcyclohexane. Examples of the constituent (d2) are: 2-ethylhexanoic acid, lauric acid, isooctanoic acid, isononanoic acid and monocarboxylic acid mixtures obtained from coconut oil or palm kernel oil.

The preparation of hydroxyl-bearing polyester resins and/or alkyd resins is described, for example, in Ullmanns Encyklopädie der technischen Chemie, third edition, Volume 14, Urban & Schwarzenberg, Munich, Berlin, 1863 [sic], pages 80 to 89 and pages 99 to 105, in the books Résines Alkyds-Polyesters by J. Bourry, Paris, Dunod publishers 1952, Alkyd Resins by C. R. Martens, Reinhold Publishing Corporation, New York 1961 and Alkyd Resin Technology by T. C. Patton, Interscience Publishers, 1962.

The binders described above can of course also be used as mixtures.

Furthermore, component (II) may include, in addition, other water-dilutable or water-dispersible binders.

Component (II) may, furthermore, include crosslinking agents which react only at relatively high temperatures with the reactive functional groups of the binders. Examples of suitable crosslinking agents are the fully blocked isocyanates to be used in accordance with the invention, described above in connection with component (I), and/or customary and known polyisocyanates, the tris(alkoxycarbonyl-amino) triazines and/or the customary and known melamine resins, amino resins, carbodiimides, aziridines, epoxides and/or siloxanes.

Further Additives

Specifically, the 2C system of the invention can comprise UV absorbers, preferably triazine compounds or benzotriazole compounds, and free-radical scavengers in at least one of the two components (I) and/or (II). The 2C system of the invention can also include rheological agents, catalysts, such as organotin compounds or compounds containing bismuth, and also other paint auxiliaries in at least one of the two components (I) and/or (II). It is of course also possible for pigments of any kind, examples being colour pigments, such as azo pigments, phthalocyanine pigments, carbonyl pigments, dioxazine pigments, titanium dioxide, pigmentary carbon black, iron oxides and chromium and/or cobalt oxides, or special-effect pigments, such a metal flake pigments, especially aluminium flake pigments and pearlescent pigments, to be incorporated in at least one of the two components (I) and/or (II). Preferably, however, transparent pigments, or no pigments, are provided.

Composition of the 2C System of the Invention

The 2C system of the invention comprises the components (I) and (II), essential to the invention, in broadly varying proportions by weight, these proportions being guided essentially by the concentrations of the reactive functional groups present in in [sic] components (I) and (II) and by the application conditions for the 2C system. The person skilled in the art can therefore easily determine the proportions by weight required for a specific end use.

In accordance with the invention, the amounts of components (I) and (II) are chosen in their proportions to one another such that the ratio of functional groups which react with isocyanate groups to NCO, especially of OH groups to NCO, is from 1.0:0.5 to 1.0:2.0, preferably from 1.0:0.8 to 1.0:1.5 and, in particular, from 1.0:0.8 to 1.0:1.3.

Preparation

The preparation of the two components (I) and (II) takes place in accordance with the customary methods, from the individual constituents, with stirring. The preparation of the 2C system of the invention from components (I) and (II) takes place likewise by means of stirring or dispersion using the equipment customarily employed: for example, by means of dissolvers or the like, or by means of the likewise customarily employed 2-component metering and mixing units, or by means of the process for preparing aqueous 2C polyurethane coating materials that is described in the German Patent DE-A-195 10 651, page 2, line 62 to page 4, line 5.

The components, especially component (II), can be formulated as nonaqueous (i.e. with organic solvents) or as aqueous components. In the case of a nonaqueous formulation it is possible to use the organic solvents customary in paintmaking. Using aqueous components, aqueous coating compositions are obtained after mixing components (I) and (II). If an aqueous coating composition is desired, the components (I) and/or (II) can alternatively be formulated to be substantially free of water and substantially free of organic solvents but dispersible in water. In this case the aqueous coating composition is obtained by mixing the components and adding water. A component (II) which is soluble or dispersible in water can be formulated in customary manner by introducing, for example, acidic groups into the binder, which are then neutralized with a customary base, for example ammonia or an organic amine such as triethylamine. The solution or dispersion of a water-dispersible component (I) and/or (II) in water is accomplished in a customary manner, for example by vigorous stirring with or without gentle heating. Alternatively, solution or dispersion in water can take place by means of nonionic emulsifiers. To this extent, reference is likewise made to standard techniques of preparing aqueous coating materials.

Use

Finally, the invention also relates to the use of the 2C system of the invention for coating a substrate. In this case, component (I) and component (II) are mixed with one another prior to application, preferably directly prior to application, to form the coating composition, this composition is applied, and the components are baked together.

Component (I) and component (II) can if desired be applied with the aid of a special two-component application device and then baked together.

The aqueous coating materials prepared using the 2C system of the invention can be used to coat primed or unprimed plastics parts and plastics films, such as e.g. ABS, AMMA, ASA, CA, CAB, EP, UF, CF, MF, MPF, PF, PAN, PA, PC, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations according to DIN 7728 Part 1).

The plastics parts and films to be coated can of course also consist of polymer blends, modified plastics or fibre-reinforced plastics. The coating compositions of the invention are preferably employed for coating PPE/PA blends, polycarbonate blends (e.g. PC/ASA, PC/PBT) and polypropylene blends. The coating compositions of the invention are employed in particular for the plastics that are commonly employed in vehicle construction, especially motor vehicle construction.

In the case of non-functionalized and/or apolar substrate surfaces, these surfaces must be subjected to a pretreatment, such as by plasma or flaming, prior to coating.

Suitable primers in this context are all customary primers, both conventional and aqueous. It is of course also possible to employ radiation-curable conventional primers and also radiation-curable aqueous primers.

The 2C system of the invention is employed for producing single-coat or multicoat finishes and, preferably, for producing top coats. Alternatively, it can be intended to produce a clear coat that is to be applied over a base coat film, for example the clear coat of a multicoat finish produced by the wet-on-wet method. The plastics or the other substrates can of course also be coated directly with the clear coat or with the top coat.

Finally, the coating compositions can also be applied to other substrates, such as metal, wood, glass or paper, for example. Application takes place with the aid of customary methods, examples being spraying, knife coating, dipping or brushing.

On the basis of the abovementioned uses, in accordance with the invention, of the 2C system of the invention, the invention also embraces coating materials and binders prepared therewith, and also the articles coated with these binders and/or coating materials.

The 2C systems of the invention are normally cured at temperatures from room temperature from [sic] to 250° C., preferably at temperatures between 60 and 180° C. and, with particular preference, at temperatures between 60 and 150° C. In specific applications, even higher curing temperatures may be employed.

The 2C systems of the invention are preferably employed to produce top coat finishes. The 2C systems of the invention can be employed in connection with both the production-line (OEM) finishing and the refinishing of car bodies.

They provide extremely advantageous coatings which are both highly scratch resistant and extremely acid-resistant.

The invention is described in more detail below with reference to the example:

Example and Comparative Experiment

A 2C system of the invention (composition B) and a conventional 2C system (composition A) were prepared from the constituents set out in Table 1 and were applied to test panels.

TABLE 1

Composition of the 2C system of the invention (B) and of the conventional 2C system (A)

| Constituents | Composition A (parts by weight) | Composition B (parts by weight) |
|---|---|---|
| Component I | | |
| Isocyanate curing agent 1[a)] | 33 | |
| Isocyanate curing agent 2[b)] | | 58.5 |
| Component II | | |
| OH acrylate[c)] | 83.97 | 83.97 |
| TIN 384[d)] | 1.2 | 1.2 |
| TIN 292[e)] | 1.0 | 1.0 |
| DBTL[f)] | 0.004 | 0.004 |
| Worlee ® ADD315[g)] | 0.096 | 0.096 |
| ZN 73-1280[h)] | 1.5 | 1.5 |
| Butyl glycol acetate | 3.93 | 3.93 |
| Xylene | 0.2 | 0.2 |
| GB ester[i] | 4.5 | 4.5 |
| Ethoxypropyl acetate | 2.0 | 2.0 |
| Butanol | 1.6 | 1.6 |
| Total | 100 | 100 |

[a)]Solution of a polyisocyanate based on hexamethylene diisocyanate (80% solution of Desmodur N 3390 from Bayer AG in butylacetate/solvent naphtha
[b)]Solution of the polyisocyanate Ia) to be used in accordance with the invention, isocyanate of 1,3-bis(methylene isocyanate)cyclohexane having an NCO content of 19.4% by weight and a viscosity of 9400 mPas (80% in methoxypropyl acetate at 25° C.), 50% in methoxypropyl acetate/solvent naphtha
[c)]Customary and known acrylate resin of styrene, n-butyl methacrylate, t-butyl acrylate, hydroxypropyl methacrylate and acrylic acid, as described in DE 197 25 188.9, diluted to 53% solids content with a mixture of methoxypropyl acetate, butyl glycol acetate and butyl acetate
[d)]Commercial light stabilizer Tinuvin 384 ® from Ciba Speciality Chemical Inc.
[e)]Commercial light stabilizer Tinuvin 292 ® from Ciba Speciality Chemical Inc.
[f)]Dibutyltin dilaurate
[g)]Commercial flow additive from Worlee, Lauenburg, DE
[h)]5% solution of a polyether-substituted polydimethylsiloxane in xylene
[i)]Glycolic acid butyl ester from Wacker Coatings Performance Tests
1. Scratch resistance
1.1 Brush test The scratch resistance of the cured 2C systems A and B was evaluated with the aid of the BASF brush test described in FIG. 2 on page 28 of the article by P. Betz and A. Bartelt, Progress in Organic Coatings, 22 (1993), pages 27 to 37, which, however, was modified in respect of the weight used (2000 g instead of the 280 g specified therein).

For this purpose the film surface was damaged using a mesh under the load of a weight. The mesh and the film surface were wetted generously with a detergent solution. The test panel was moved backwards and forwards under the mesh in lifting movements by means of a motor drive.

To prepare the test panels, an electrodeposition coating material was applied first of all with a film thickness of 18–22 μm, then a surfacer with a film thickness of 35–40 μm, then a black base coat with a film thickness of 20–25 μm and, finally, the test coating composition with a film thickness of 40–45 μm, and each of the films was cured. Following application of the coating materials, the panels were stored at room temperature for 2 weeks before the test was carried out.

The testing element was an eraser (4.5×2.0 cm, broad side vertical to the direction of scratching) wrapped with nylon mesh (No. 11, 31 μm mesh size, $T_g$ 50° C.). The applied weight was 2000 g.

Prior to each test the mesh was renewed, with the running direction of the meshes parallel to the direction of scratching. Using a pipette, about 1 ml of a freshly agitated 0.25% Persil solution was applied in front of the eraser. The rotary speed of the motor was set so that 80 double strokes were performed within a period of 80 s. Following the test, the remaining washing liquid was rinsed off with cold mains water and the test panel was blown dry with compressed air.

The parameter measured was the gloss in accordance with DIN 67530 before and after damaging (direction of measurement perpendicular to the direction of scratching). The results are compiled in Table 2.

1.2 Sand Test

In addition, the scratch resistance was determined by the sand test. For this purpose the film surface was subjected to sand (20 kg of quartz silver sand 1.5–2.0 mm). The sand was placed in a beaker (whose base had been cut off in a planar manner), which was fastened firmly to the test panel. The test panels used were the same as described above in the brush test. By means of a motor drive, the panel with the beaker and the sand was set in shaking motions. The movement of the loose sand in the course of these motions brought about damage of the film surface (100 double strokes in 20 s). After sand exposure, the test surface was cleaned to remove abraided material, wiped carefully under a jet of cold water, and then dried with compressed air. The parameter measured was the gloss in accordance with DIN 67530 before and after damaging.

The results are likewise given in Table 2.

TABLE 2

Scratch resistance of the coatings produced from the 2C system of the invention (B) and from the conventional 2C system (A)

| Gloss values | Composition A | Composition B |
|---|---|---|
| Initial gloss (20°) | 84 | 83 |
| Residual gloss (20°/Λ:) | | |
| Brush test | 51 (33) | 49 (34) |
| Sand test | 56 (28) | 54 (29) |

Acid Resistance By the BART Acid Test

The BART (BASF ACID RESISTANCE TEST) was used to determine the resistance of film surfaces against acids, alkalis and water drops. In this case the coating was exposed in a gradient oven, after baking, to further temperature stresses (30 min at 40° C., 50° C., 60° C. and 70° C.). Prior to this the test substances had been applied in a defined manner with a metering pipette (sulphuric acid 15% [sic], 10%, 36%; sulphurous acid 6%, hydrochloric acid 10%, sodium hydroxide solution 5%, deionized water 1, 2, 3 or 4 drops) Following exposure to the substances, the latter were removed under running water and the damage was assessed visually after 24 h in accordance with a predetermined scale:

| 0 | no defect |
|---|---|
| 1 | slight marking |
| 2 | marking/matting/no softening |
| 3 | marking/matting/colour change/softening |
| 4 | cracks/incipient etching |
| 5 | clear coat removed |

Each individual mark (spot) was evaluated and the result for each coating was obtained in appropriate form (e.g. ratings total for one temperature).

The results of the tests are given in Table 3.

TABLE 3

The acid resistance of the coatings produced from the 2C systems of the invention (B) and the conventional 2C systems (A)

| | Composition A | | | | Composition B | | | |
|---|---|---|---|---|---|---|---|---|
| Temperature (° C.) | 40 | 50 | 60 | 70 | 40 | 50 | 60 | 70 |
| $H_2SO_4$ 1% | 0 | 0 | 0 | 4 | 0 | 0 | 0 | 1.5 |
| $H_2SO_4$ 10% | 0 | 0 | 0 | 4 | 0 | 0 | 0 | 1.5 |
| $H_2SO_4$ 36% | 0 | 0 | 0.5 | 4.5 | 0 | 0 | 0 | 1.5 |
| HCl 10% | 0 | 0 | 0 | 0.5 | 0 | 0 | 0 | 2 |
| $H_2SO_3$ 5% | 0 | 0 | 0 | 3 | 0 | 0 | 0 | 1.5 |
| NaOH 5% | 0 | 0 | 0 | 0.50 | 0 | 0 | 0 | |
| Deionized water 1 | 0 | 0 | 0 | 0 | 0 | 0 | 0 | 0.5 |
| Deionized water 2 | 0 | 0 | 0 | 0 | 0 | 0 | 0 | 0 |
| Deionized water 3 | 0 | 0 | 0 | 0 | 0 | 0 | 0 | 0 |
| Deionized water 4 | 0 | 0 | 0 | 0 | 0 | 0 | 0 | 0 |
| Total acid: | 0 | 0 | 0.5 | 16.5 | 0 | 0 | 0 | 8 |
| Total water: | 0 | 0 | 0 | 0 | 0 | 0 | 0 | 0.5 |

The results of the brush test and of the sand test on the one hand, and of the BART on the other, underline the fact that the 2C system of the invention, B, corresponds in its scratch resistance to the conventional 2C system A but greatly exceeds the latter in acid resistance.

What is claimed is:

1. Two-component coating composition comprising
   (I) a component which comprises at least one isocyanate as crosslinking agent,
   (II) a component which comprises at least one binder having functional groups which react with isocyanate groups, wherein component (I) is selected from the group consisting of Ia), Ib) and Ic) and mixtures thereof wherein component Ia) comprises at least one isocyanate having at least one diisocyanate structural unit which
   i) has an unsaturated/aromatic or non-aromatic ring structure having 5–10 ring atoms and
   ii) has two isocyanate groups attached to the ring structure, where
   iii) in the case of a non-aromatic ring structure the isocyanates are attached via one of
      α) one isocyanates is attached via a linear $C_1$–$C_9$-alkyl and the other isocyanate group via a linear $C_2$–$C_{10}$-ether-alkyl,
      β) one isocyanate group is attached directly and the other isocyanate group via a linear $C_2$–$C_{10}$-ether-alkyl,
      γ) both isocyanates are attached via a linear $C_2$–$C_{10}$-ether-alkyl, and
      δ) one isocyanate is attached via a linear $C_1$–$C_9$-alkyl and the other isocyanate via a linear $C_2$–$C_9$-alkyl, and
   iv) in the case of an unsaturated/aromatic ring structure at least one of the two isocyanate groups is attached via linear $C_2$–$C_9$-alkyl and/or linear $C_2$–$C_{10}$-ether-alkyl, both of which radicals have no benzylic hydrogen atoms, to the ring structure, wherein the linear $C_2$–$C_9$-alkyl has a structure —$CR^1R^2$—$(CH_2)_n$—, where in n=1 to 8, and wherein $R^1$ and $R^2$ are each independently at least one of $C_1$–$C_{10}$-alkyl, aryl, and halogen, component Ib) comprises at least one oligomer of the isocyanate Ia) having from 2 to 10 isocyanate units; and component Ic) comprises compounds selected from the group consisting of at least one partially blocked isocyanate Ia and an oligomer Ib), and mixtures thereof.

2. The two-component coating composition according to claim 1, wherein the ring structure comprises atoms selected from the group consisting of N, O and Si atoms and mixtures thereof.

3. The two-component coating composition according to claim 2, wherein the ring structure comprises a structure selected from the group consisting of silacyclopentane, silacyclohexane, oxolane, oxane, dioxane, morpholine, pyrrolidine, imidazolidine, pyrazolidine, piperidine, quinuclidine, pyrrole, imidazole, pyrazole, pyridine, pyrimidine, pyrazine, pyridazine and triazine rings.

4. The two component coating composition according to one of claim 1, wherein the ring structure is selected from the group consisting of a bicyclic terpene framework, decalin, adamantane and quinuclidine ring structures.

5. The two-component coating composition according to claim 4, wherein the terpene framework is selected from the group consisting of carane, norcarane, pinane, camphane and norbornane frameworks.

6. The two-component coating composition according to claim 1, wherein the ring structure is a 6 C atom ring.

7. The two component coating composition according to claim 1, wherein the linear $C_1$–$C_9$-alkyl is selected from the group consisting methylene, ethylene, and tri-, tetra-, penta-, hexa-, hepta-, octa- and nonamethylene radicals.

8. The two-component coating composition according to claim 1, wherein both isocyanate groups are attached via —$CR^1R^2$—$CH_2$—$CH_2$— to positions 1 and 3 of a benzene ring.

9. The two-component coating composition according to claim 1, wherein component (I) comprises from 10 to 90% by weight based on the overall amount of the crosslinkers in component (I), of crosslinkers selected from the group consisting of fully blocked isocyanates Ia), fully blocked oligomer Ib); other polyisocyanates, partially blocked other polyisocyanates, fully blocked other polyisocyanates, oligomers, of these other polyisocyanates; partially and fully blocked oligomers, of these other polyisocyanates, isocyanate-functional polyurethane prepolymers, partially and fully blocked isocyanate-functional polyurethane prepolymers; tris(alkoxycarbonylamino)triazines, melamine resins, amino resins, carbodiimides, aziridines; epoxides and siloxanes, and mixtures thereof.

10. The two-component coating composition according to claim 1, characterized in that component (II) comprises at least one binder having functional groups which react with isocyanate groups.

11. The two-component coating composition according to claim 10, wherein the binder is selected from the group consisting of polyacrylates, polyesters, polyurethanes, acrylicized polyurethanes, acrylicized polyesters and mixtures thereof.

12. The two-component coating composition according to claim 10 or 11, wherein the functional groups used are hydroxyl groups.

13. The two-component coating composition of claim 1, wherein the amounts of components (I) and (II) are chosen in their proportions to one another such that the ratio of functional groups which react with isocyanate groups to NCO is from 1.0:0.5 to 1.0:2.0.

14. A process for coating a substrate comprising, mixing component (I) and component (II) of claim 1 prior to application to form the coating composition, applying the composition to a substrate, and baking the components together.

15. A coating composition according to claim 1 comprising a top coat.

16. The two-component coating composition according to claim 1, wherein component Ib) comprises a trimer of the isocyanate Ia) having from 2 to 10 isocyanate units.

17. The two-component coating composition according to claim 6 or 7, wherein the ring structure is a cyclohexane ring, and one isocyanate group is attached via a $C_3$–$C_9$-alkyl to position 1 and one isocyanate group is attached directly to position 2 of the cyclohexane ring.

18. The two-component coating composition according to claim 1, wherein n=1 to 4.

19. The two-component coating composition of claim 1, wherein the amounts of components (I) and (II) are chosen in their proportions to one another such that the ratio of functional groups which react with isocyanate groups to NCO is from 1.0:0.8 to 1.0:1.5.

20. The two-component coating composition of claim 1, wherein the amounts of components (I) and (II) are chosen in their proportions to one another such that the ratio of functional groups which react with isocyanate groups to NCO is from 1.0:0.8 to 1.0:1.3.

21. The two-component coating composition of claim 1, wherein in the case of a non-aromatic ring structure both isocyanates are attached via a linear $C_2$–$C_9$-alkyl.

* * * * *